June 20, 1944.  R. A. GOEPFRICH  2,351,953

BRAKE

Filed Nov. 3, 1939

INVENTOR.
RUDOLPH A. GOEPFRICH
BY Jerome R. Cox
ATTORNEY.

Patented June 20, 1944

2,351,953

UNITED STATES PATENT OFFICE 2,351,953

BRAKE

Rudolph A. Goepfrich, South Bend, Ind., assignor to Bendix Aviation Corporation, South Bend, Ind., a corporation of Delaware Application November 3, 1939, Serial No. 302,659

1 Claim. (Cl. 188—152)

This invention relates to brakes, and more particularly to hydraulic braking systems.

One of the problems connected with the use of hydraulic brakes is the limitation on allowable working pressure within the hydraulic lines and the master cylinder.

Excessively high pressures in the system have a detrimental effect on the master cylinder cup, often causing it to scuff and tear when the lip passes the compensating port in the master cylinder. High pressures may also cause abnormal hose expansion and multiply the possibilities of leaks at the connections and of bursting the tubing.

And yet it is often found impossible to satisfactorily decelerate some of the very heavy present day vehicles without using extremely high pressures in the hydraulic lines.

To meet the problem presented by this situation, I have developed a method for stepping up the pressure at the wheel cylinders without increasing the pressure in the master cylinder or in the lines between the master cylinder and the wheel cylinders.

The first object of this invention, therefore is to provide for stepping-up the pressure in the hydraulic system at the wheel cylinders.

Other step-up devices have been provided but this one has the advantages of simple and inexpensive construction, plus easy attachability and detachability from the main hydraulic system. It protects the master cylinder and its conduits from the strain of extremely high pressure braking, while it accomplishes that same high pressure braking without the use of complicated and expensive wheel cylinders.

A second object of the invention is the provision of a novel and simple two-stage device, i. e., one which provides for quick clearance take-up in the brakes at low pressures followed by higher pressures after the shoes have contacted the drum.

Such two-stage devices have been often suggested in the prior art, but, in the majority of cases, the two-stage effect is accomplished by providing a master cylinder with two operating pistons, or a wheel cylinder with specially constructed brake-applying cylinders. This device is a valve which may be mounted on or demounted from the wheel cylinder at will.

Another feature of my device is the effect which may be secured by removing the valves, which are easily detachable, from, for example, the front wheels in order to provide a higher braking ratio of rear wheels over front wheels in winter driving. In such a case the brake hoses can be attached directly to the wheel cylinders.

By making the unit reversible, the braking on the front wheels could be reduced to one-fourth of its original value.

Application Serial No. 444,020, filed May 22, 1942, is a continuation in part of the present application.

Other objects and features of my invention will be apparent from the subjoined specification and claims, and from the accompanying drawing, in which:

Figure 1:
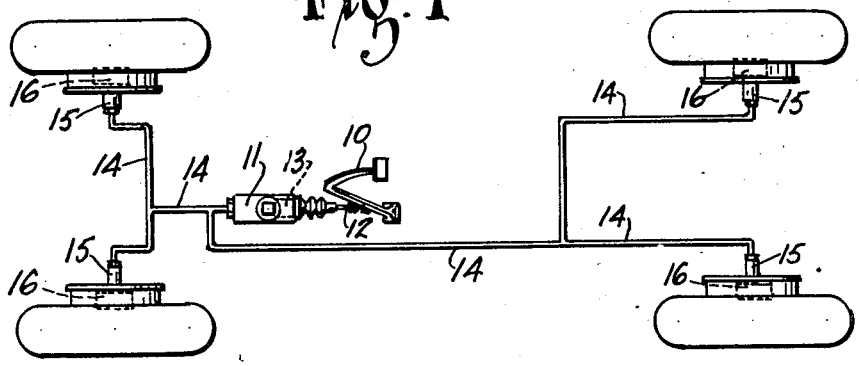
Figure 1 is a diagrammatic view of a hydraulic brake system installed in an automotive vehicle.

In Figure 1, the numeral 10 indicates a brake pedal which is arranged to apply pressure on fluid in a master cylinder 11 by means of rod 12 and piston 13 in the cylinder. The master cylinder is connected by conduits 14 to one end of valves 15, which in turn are attached to wheel cylinders 16 arranged to apply the brake shoes to the brake drums.

Figure 2:
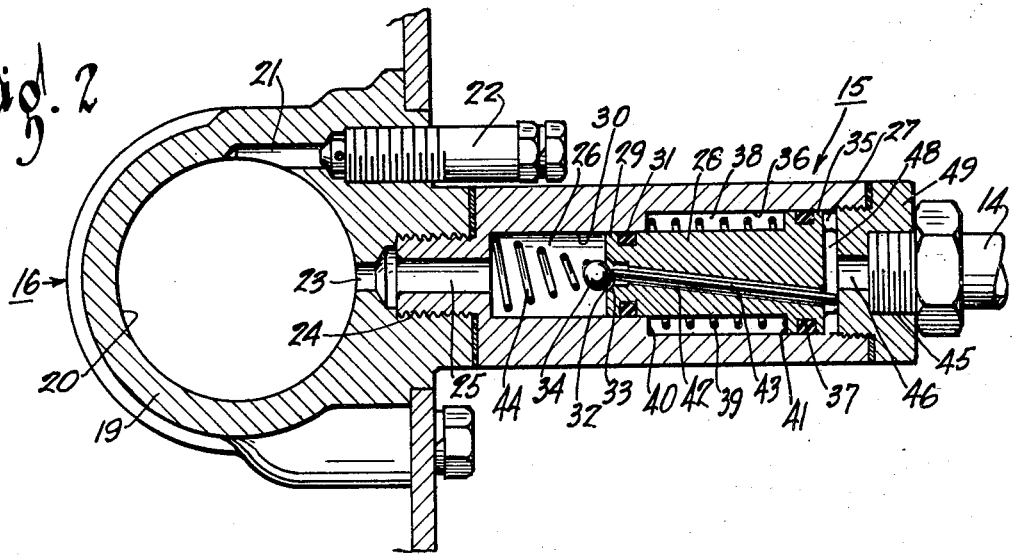
Figure 2 is a section showing my valve applied to the usual wheel cylinder for applying the brakes.

Referring now to Figure 2, we find an enlargement of the wheel cylinder and valve designated respectively as 16 and 15. The wheel cylinder as shown consists in a casing 19 which contains an internal cylinder or bore 20, wherein the brake-applying pistons (not shown) may operate. At the upper end of cylinder 16, a passage 21 is provided through casing 19. Inserted in an enlarged end of passage 21 is a bleeder screw 22, which makes a screw-tight fit with the opening, and which may be removed by unscrewing when it is desired to bleed the hydraulic system.

A second opening 23 is provided in casing 19. An enlarged outer end of this opening, shown at 24, is provided with an internal threading, into which may be screwed one end of the valve 15. A passage 25 in the end of valve 15 at all times connects with openings 23 and 24 to provide free communication between the internal bore 20 of the wheel cylinder and a high pressure chamber 26 of the valve 15.

Valve 15 contains a high pressure chamber 26, mentioned above, and a low pressure chamber 27. A piston 28 is inserted in the valve and is arranged to move reciprocably therein. One end of the piston, shown at 29, extends within the high pressure chamber 26 and is of such diameter as to engage the inner wall 30 of high pressure chamber 26. This end of the piston is sealed in the chamber 26 by means of an annular sealing ring 31. The piston face 29 is provided with a central groove 32 the inner surface of which serves as a valve seat 33 arranged to seat check ball 34 when the piston moves toward the wheel cylinder.

The opposite end of the piston, shown at 35, extends into low pressure chamber 27 and is of such diameter as to slidingly engage the inner wall 36 of the low pressure chamber. This end of the piston is sealed in chamber 27 by an annular sealing ring 37.

When the brakes and the step-up valve are in released position the small diameter section of the piston extends for some distance into the interior of chamber 27, the inner wall 36 of the chamber and the outer circumference of the piston thus forming an annular chamber 38, in which is a spring 39, engaging at one end an abutment 40 formed in the valve casing where the high pressure and low pressure chambers meet, and engaging at the other end an abutment 41 formed in the piston 28 where the large diameter and small diameter portions of the piston meet.

Liquid normally in high pressure chamber 26 is sealed from liquid in low pressure chamber 27 except for passage 42 which extends through the length of piston 28 and connects the two chambers. This passage extends from a central groove 32 in the small diameter end of the piston to an opening placed off-center in the large diameter end of the piston.

Inserted in the passage is a grooved or corrugated rod 43, which at its inner end contacts ball 34, and which is of sufficient length to allow its outer end to extend into chamber 27 when ball valve 34 is seated on valve seat 33. A spring 44, which rests at one end against the valve casing, is arranged to yieldingly hold the ball 34 against inward movement, thus causing the ball to seat when the piston 28 moves toward the wheel cylinder.

The rod 43 is corrugated to form a plurality of lengthwise grooves in its outer surface which allow the free passage of brake-applying fluid through the passage 42.

Figure 3:
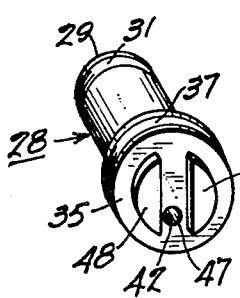
Figure 3 is a perspective view of the piston-like member forming a part of my novel valve.

As shown in Figure 3, the large diameter end of the piston has two crescent shaped ridges 48 extending therefrom which prevent the large diameter end of the piston from coming into sealing contact with the inner surface of cap 49 which is screwed into the valve 15 at its outer end. Cap 49 is provided as at 45 with internal threading into which is screwed one end of a conduit 14. Thus liquid from the master cylinder is free to flow from conduit 14 through a passage 46 provided in cap 49 into low pressure chamber 27 at a point between the ridges 48.

The ridges 48 have at least two necessary or advantageous functions. One is to hold the end 47 of passage 42 at all times open to fluid from the master cylinder. The other is to allow the initial pressure of fluid from the master cylinder to be effective over a greater portion of the large diameter end of the piston than would be possible if the large end of the piston were allowed to come into sealing contact with cap 49, leaving only an area equal to the diameter of passage 46 subject to initial pressure.

The operation of my device is as follows: In the released position the piston spring 39 urges the piston against the inner surface of the cap. The corrugated rod, being pressed at one end against the cap, holds the check ball 34 off its seat, allowing free fluid communication through the system.

When pressure is created in the master cylinder, initially the pressures in the high-pressure chamber and the low pressure chamber are equal; however, because of the differential areas of the respective ends of the piston, the piston is caused to move toward the wheel cylinder, whereupon the check ball spring 44 seats the check ball. Any additional pressure produced in the low pressure side is automatically stepped up in the high pressure chamber in proportion to the respective areas of the differential ends of the piston. By providing a piston with predetermined differential areas any desired ratio of master cylinder pressure to brake-applying pressure may be secured. In release, as soon as the pressure in the low pressure side is reduced by releasing the brake pedal, the differential piston moves to the right until it is against its stop and the check ball is raised from its seat by the corrugated rod, thus releasing the brakes.

If the piston spring 39 is made of such weight that the pressure produced by the master cylinder overcomes the brake spring pressures before the former is compressed, then the device acts as a quick clearance take-up at the lower pressures, the higher pressures being created in the wheel cylinder only after the shoes have contacted the drum. This would decrease the length of the stroke necessary in the step-up unit and provide a two-stage braking effect, comprising an initial low pressure, high displacement stage, followed by a secondary high pressure, low displacement stage.

In a truck or other vehicle equipped with four of these valves, one at each wheel cylinder, reduced braking on the front wheels for winter driving could be had by removing the step-up valves from the front wheels and attaching the brake hose directly to the wheel cylinders. Also, by making the valve reversible, the braking on the front wheels could be reduced to one-fourth of its original value.

It is not intended that my invention be limited by the above illustrations and descriptions thereof, but only by the terms of the appended claim.

I claim:

A hydraulic braking system comprising a master cylinder, a wheel cylinder having a threaded opening therein, a device having an externally threaded portion at one end thereof screwed into said bore and a threaded opening therein at the end opposite the externally threaded portion of the same diameter as the opening in the wheel cylinder, said device constituting a two-stage pressure control for first maintaining the same fluid pressure in the wheel cylinder and master cylinder and subsequently converting pressure produced in the master cylinder into higher pressure operating in the wheel cylinder, and a conduit connected at one end to the master cylinder and having its other end externally threaded so that it may be screwed into the opening in the wheel cylinder or into the opening in the two-stage pressure control device.

RUDOLPH A. GOEPFRICH.